United States Patent [19]
Langer

[11] 4,344,324
[45] Aug. 17, 1982

[54] FLAT BELT TIRE TESTER

[75] Inventor: William J. Langer, Eden Prairie, Minn.

[73] Assignee: MTS Systems Corporation, Minneapolis, Minn.

[21] Appl. No.: 215,428

[22] Filed: Dec. 11, 1980

Related U.S. Application Data

[63] Continuation-in-part of Ser. No. 14,436, Feb. 23, 1979, Pat. No. 4,238,954.

[51] Int. Cl.³ .................... G01M 17/02; B65G 15/64
[52] U.S. Cl. ..................................... 73/146; 198/837; 474/123
[58] Field of Search .............. 73/146; 474/123; 73/8, 73/9, 126, 123; 198/837

[56] References Cited

U.S. PATENT DOCUMENTS

| | | | |
|---|---|---|---|
| 3,520,180 | 7/1970 | Polhemus et al. | 73/71.7 |
| 3,797,306 | 3/1974 | Petersen et al. | 73/146 |
| 3,977,243 | 8/1976 | Kyoto et al. | 73/146 |
| 4,023,426 | 5/1977 | Duryea, Jr. | 74/241 |
| 4,238,954 | 12/1980 | Langer | 73/146 |

FOREIGN PATENT DOCUMENTS 492778  2/1976  U.S.S.R. ................... 73/146

OTHER PUBLICATIONS

Development of a Flat Surface Tire Rolling Resistance Facility in Tech. Paper Series–SAE No. 780635, 1978.
Tirp in the Making, In Calspan Corp., Bulletin, 1973.
SRU Flat Belt Forece & Moment Machine, in Akron Standard Corp., Pub. No. 108-340-102-1977.
The Calspan Tire Research Facility, In SAE No. 730582, 1973.

*Primary Examiner*—Donald O. Woodiel
*Attorney, Agent, or Firm*—Kinney, Lange, Braddock, Westman and Fairbairn

[57] ABSTRACT

The flat belt tire tester which permits mounting a wheel and tire to be tested about an axis positioned above a flat belt, and has framework and controls for lowering the tire into contact with the belt under desired loads, using desired adjustments for camber and steering. The belt is powered, and can thus be used for testing the tire under simulated road conditions. The mounting framework and belt mounting construction of the present invention provides substantial rigidity through having the mounting frame geometry properly oriented in relation to the contact surface of the belt and also by providing a stiff frame for the belt mounting drums or pulleys.

10 Claims, 8 Drawing Figures

FLAT BELT TIRE TESTER

CROSS REFERENCE TO RELATED APPLICATION

This application is a continuation-in-part of my copending application Ser. No. 14,436, filed Feb. 23, 1979, for FLAT BELT TIRE TESTER, issued as U.S. Pat. No. 4,238,954 on Dec. 16, 1980.

BACKGROUND OF THE INVENTION

1. Field of the Invention

The present invention relates to tire testing machines utilizing a flat belt for a simulated road surface.

2. Prior Art

In the prior art various tire testing machines have been advanced. The testing of tires utilizing a flat belt surface is described in one form in U.S. Pat. No. 3,977,243. In this patent a flat belt is mounted on drums or pulleys and is power driven. A large framework is utilized spanning the belt to provide for mounting a rotating wheel and tire on a steerable framework relative to the overhead bridge type frame. The tire can be raised and lowered with respect to the upper reach of the driven belt, and thus loaded, while the tire is adjusted for camber and moved to simulate steering action. The unit further includes separate drive means for the belt and for the wheel and tire so that a slippage test can be conducted with a known amount of slip between the two surfaces. Control apparatus is provided in U.S. Pat. No. 3,977,243, and the parameters which normally are being tested are explained. However, the unit relies upon a relatively large bridge type framework for obtaining the necessary rigidity, and the belt mounting apparatus provides for a substantial span of belt between drums which makes it difficult for controlling the belt under lateral loads from camber, steering or tire asymmetry.

A compensating belt stabilizing apparatus which is for a tire testing machine is shown in U.S. Pat. No. 4,023,426. This device provides for a structure intended to compensate for forces imparted to the belt during tire testing.

Another type of road simulator facility is shown in U.S. Pat. No. 3,520,180 which utilizes a flat belt to simulate a roadway, but is made so that an entire vehicle can be mounted in position on the simulated roadways for testing the tires and other parts of the vehicle in place.

Further, Calspan Corporation, of Buffalo, N.Y., has published documents about its work in tire research, as outlined in the Society of Automotive Engineers Publication, "The Calspan Tire Research Facility: Design, Development and Initial Test Results" by K. D. Bird and J. F. Martin, Publication No. 730582 of the Society of Automotive Engineers, Inc., at that time of 2 Pennsylvania Plaza, New York, N.Y. 10001. The SAE is believed to now be at the address of 400 Commonwealth Dr., Warrendale, Pa. 15096. The facility includes large overhead framework for mounting a tire so that it can be moved into engagement with a belt simulating a roadway and can be cambered and steered as shown in the report, and in particular FIG. 1.

Calspan also has put out a brochure relating to this device entitled "TRIF In The Making", their No. D78474-3C which provides background information on various flat belt tire testers. As can be seen, in addition to using belts, there were devices that provided for testing tires on a parent vehicle, with the test apparatus supported by the vehicle, and also model tire testers were made utilizing flat belts mounted on a pair of large pulleys with overhead supports, again, for mounting the tire so that it would engage the flat belt. A further device advanced by Akron Standard, Machinery Division, of Akron, Ohio, their Specification No. 108-340-102 shows a drawing of a tire tester which utilizes a flat belt for simulating a roadway, and a support spindle that is mounted onto a relatively large frame using vertical ways that are offset from the belt.

In all of the devices, without the use of an overhead spanning bridge type frame, there are substantial moments that can be generated in supporting devices, and when the bridge type frames have been utilized, adjustments have been a problem, as well as obtaining proper control of the forces that are put into the tire. Further, it has been a problem to keep the belt mounting structure rigid enough to provide adequate control and support for the belt.

The Society of Automotive Engineers, Inc., Publication No. 780635 is a paper presented at the 1978 Passenger Car Meeting, June 5–9, 1978 and relates to the development of a flat surface tire rolling resistance facility at General Motors Corporation. This publication shows photographs of a unit which provides for a belt that can be driven, having a tire support frame that is positioned to the side of the belt so that the tire is cantilevered out from the frame, and thus involves moment loads on the frame.

Further, it has been necessary in most of the tire testers utilizing a flexible type belt for a simulated roadway to crown the drums mounting the belt to keep the belt tracking properly when it is subjected to loads such as a steering or camber load from a tire which tends to shift the belt from one side of the drums to the other.

Another problem is maintaining adequate stiffness in the supporting members for the belt drums.

Rolling drum type tire testers, where the tire is loaded directly against a rotary drum, are exemplified by U.S. Pat. No. 3,797,306.

SUMMARY OF THE INVENTION

The present invention relates to a tire testing machine which provides for a flat belt simulated roadway surface coupled through suitable framework to a mounting for a rotating wheel and tire. The tire is capable of being moved under known loads into engagement with the simulated roadway, steered, and tilted in camber under positive control. The tire supporting framework is mounted relative to the roadway so that the camber loading axis and the steering axis define a plane and the steering axis remains in this plane while it is being loaded under camber.

The framework that permits loading the tire in camber is also mounted so that there is very little camber load deflection on the mounting frame.

The framework utilized with the present invention is made so that except for the tire radius changes when different size tires are tested the machine has constant reactions. The camber reaction is always the same distance from the tire patch (where it contacts the test belt) and thus it is easier to compensate for deflection in provided controls that are normally used with such testers.

As shown, the framework utilized for mounting the tire and providing the steering function is made so that it tends to get stiffer as larger tires are utilized, and thus providing for the greatest stiffness when larger tires requiring higher loads for testing are in the machine.

The mounting rollers or drums for the flat belt of the present invention are also mounted in a unique way to provide a belt steering function to react side loads on the belt caused by camber, tire steering angle and tire asymmetry. The idler roller or drum used for taking up belt tension further is mounted through a torsion tube structure which holds the idler pulley assembly extremely stiffly to reduce unwanted belt stress and misalignment.

The device utilizes normal servovalve controls with closed loop feedback. Sensor or transducers measure the loads being applied to the tire and provide the feedback signals. The controls perform the desired test functions in response to a series of steps in a program.

More specifically, as constructed, all of the controlled forces pass through the tire contact plane with the geometry of the frame utilized, and thus the loading of the frame is more easily controlled and provides for more rigid support.

DESCRIPTION OF THE PREFERRED EMBODIMENT

Figure 1:
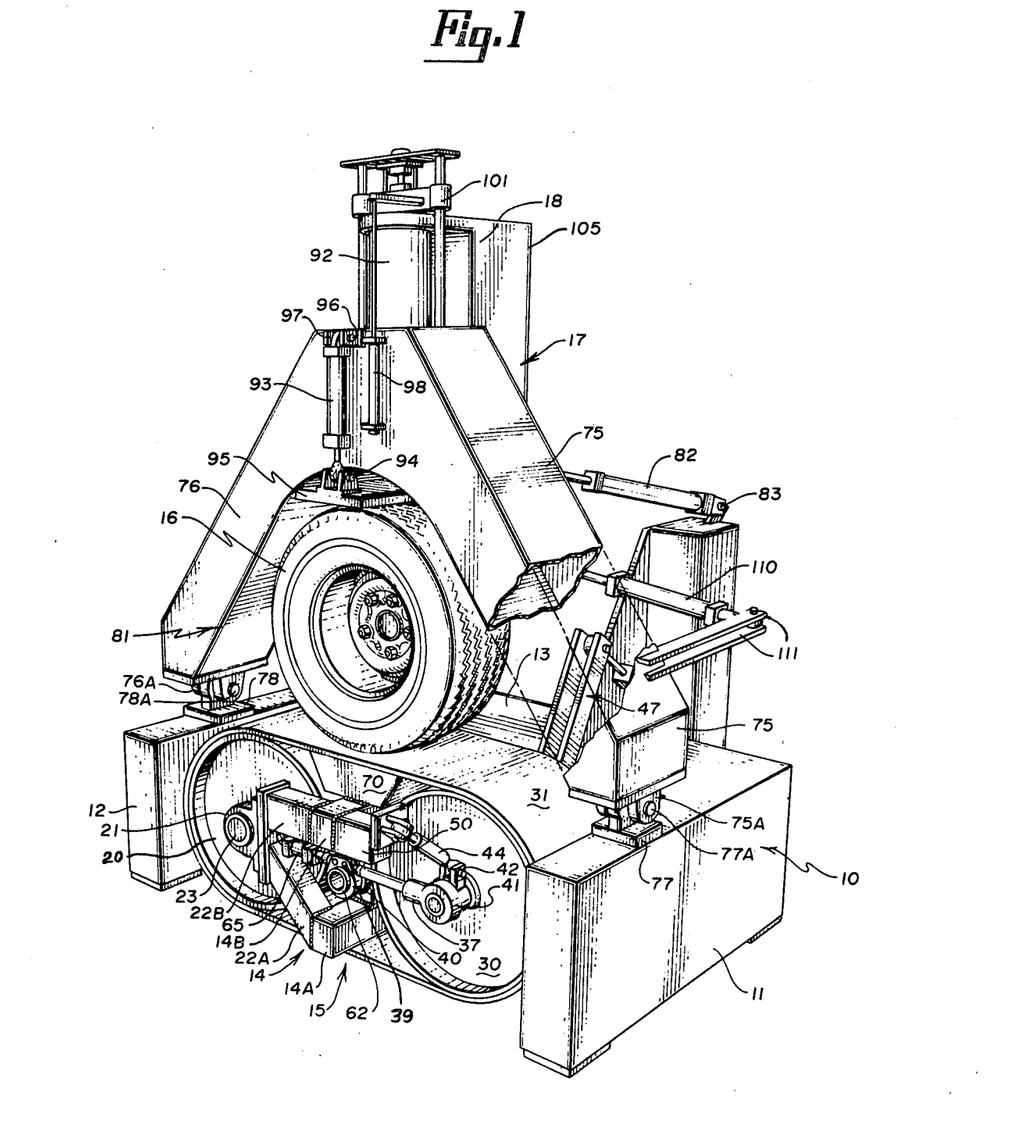
FIG. 1 is a perspective view of the tire testing machine made according to the present invention.
Figure 2:
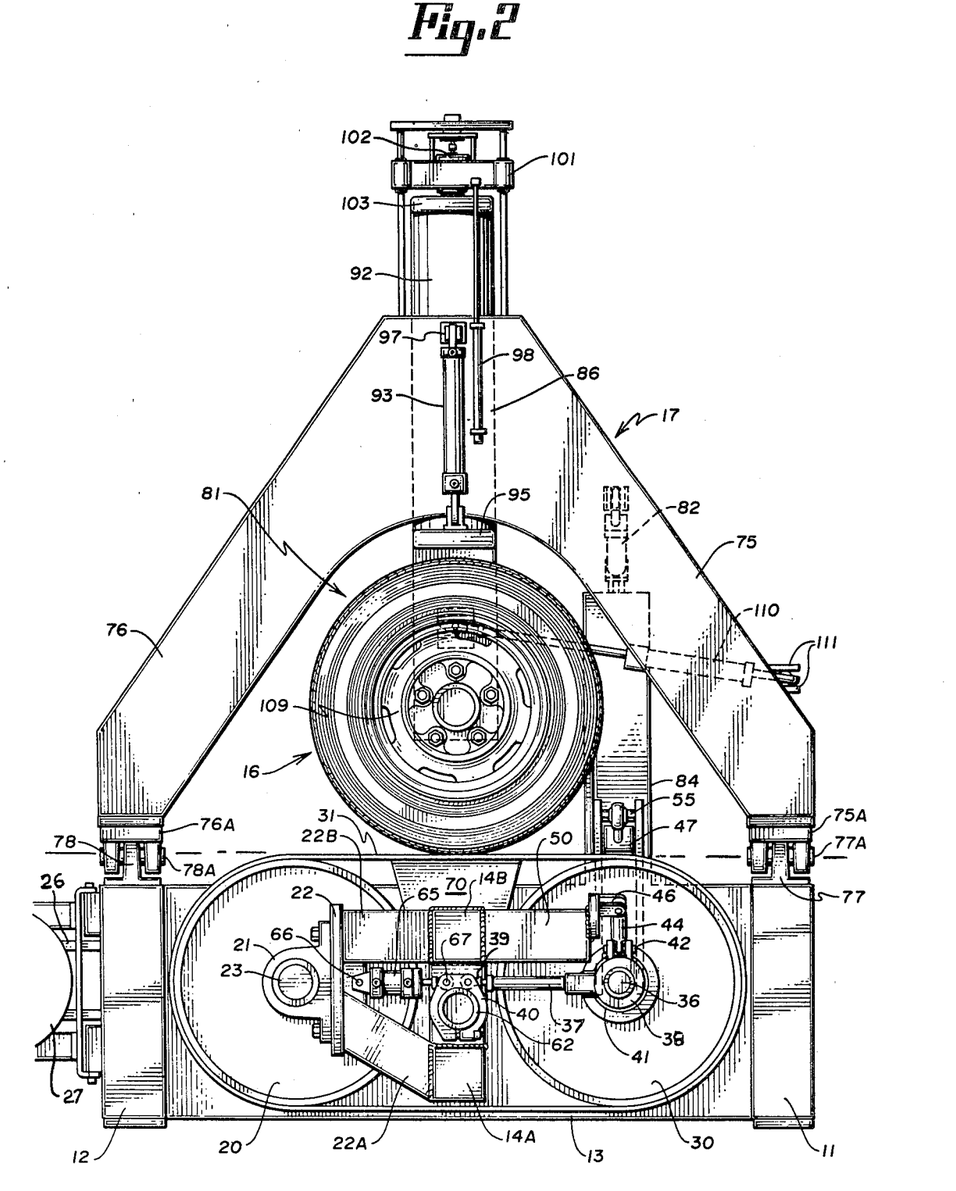
FIG. 2 is a side elevational view of the device of FIG. 1.

Referring first primarily to FIGS. 1 and 2, the tire testing machine of the present invention comprises a main support base frame 10 which somewhat resembles the letter E laying on its side, and includes a first leg 11, a second leg 12, which are parallel to each other and define the ends of the frame, and a back member 13 which supports the legs 11 and 12. A center frame leg which is shown at 14 is used for supporting components of the assembly and will be further explained and can be better seen in FIG. 7.

A road simulator belt assembly indicated generally at 15 is positioned between the legs 11 and 12, and is actually supported from the center leg 14, as will be explained.

The mounting mechanism for the tire 16, which is to be tested, comprises an "A" frame assembly indicated generally at 17 that is pivotally mounted with respect to the legs 11 and 12. The A frame 17 in turn has a guideway that supports a column assembly 18 used for vertical movement and for loading the tire 16 downwardly against the road simulator belt, as well as for permitting steering of the tire about an upright axis.

The major components of the tire testing machine thus are primarily structural framework. As will be mentioned, suitable known controls are utilized to operate the device.

Figure 6:
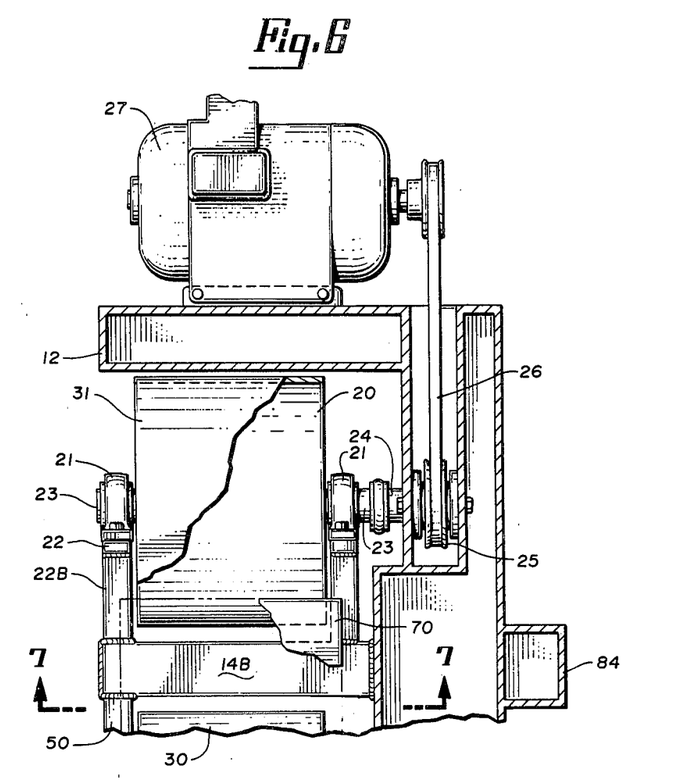
FIG. 6 is a fragmentary top plan view of the driven belt drum and drum support with parts broken away.

The road simulator belt assembly indicated generally at 15 is made so that the mounting drums for the belt are close together and are coupled rigidly to the center section of the support base frame. A first mounting drum or roller 20 is rotatably mounted in a pair of bearings 21 which in turn are supported on bases 22 which are supported on the center frame 14. Center frame 14 resembles an "H" placed on its side, as perhaps best seen in FIG. 7. The frame 14 includes a top frame rail 14B, a lower frame rail 14A and a connecting wall 14C. First ends of rails 14A and 14B are bolted to back member 13 and the rails are parallel to walls 11 and 12. Frame sections 22A are welded to the upper member 14B and diagonal braces 22B are welded to the lower member 14A of the center frame portion 14. The drum 20 includes a central shaft 23 that is drivably connected to the drum so that drive power for the belt unit can be made through shaft 23. As shown in FIG. 6, the shaft 23 is suitably coupled to a second shaft 24 that is mounted in suitable bearings mounted on back member 13. The shaft 24 extends through the back member 13 of the support base frame 10, and a belt pulley or suitable other drive member 25 is mounted on the outer end of the shaft 24. A belt 26 leads to a motor 27 (FIG. 5) that can be suitably and conveniently mounted on the frame member 12. The motor may be braked and changed in speed for testing if desired.

It thus can be seen that the frame members 22A and 22B provide a very rigid support for the respective bearings 21 and thus for the shaft 23 and the attached belt drum or roller.

Figure 4:
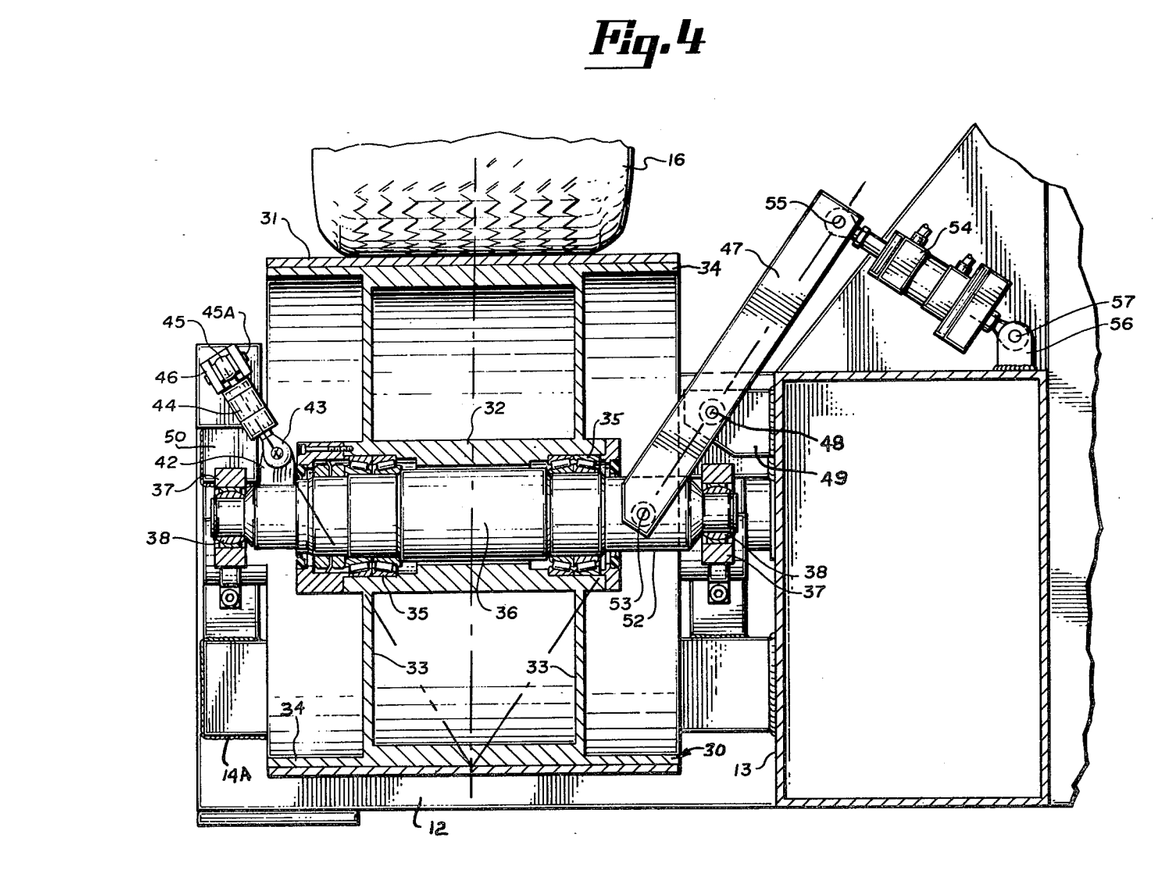
FIG. 4 is a sectional view taken generally along line 4—4 in FIG. 1.

A take-up belt drum 30 comprises the other member for mounting a belt 31. The belt 31 is an endless belt of a suitable type used for tire testing. The take-up drum 30 is a free-wheeling drum mounted on a nonrotating shaft. Referring specifically to FIG. 4, it can be seen that the take-up drum has a central hub 32 which mounts radial support webs 33, which in turn support an outer annular wall 34 forming the outer support wall of the drum. The hub 32 has suitable bearings 35 mounted in the interior, and these bearings serve to rotatably mount the hub, and the complete drum assembly, with respect to a shaft 36 which is nonrotatably mounted. The shaft 36 is supported for constrained movement at its outer ends through a pair of links 37,37 (see also FIG. 2) which have spherical seat or rod end bearings indicated generally at 38 in FIG. 4 that permit the shaft to move laterally or up and down as constrained by other linkages.

The opposite ends of links 37 from the shaft 36 are attached through spherical seat rod end bearings 39 to separate levers 40 fixedly mounted to opposite ends of a torsion tube. The links 37 carry compression or tension loads and are adjustable in length.

The outer end of shaft 36 has suitable connecting ears 42 rigidly fastened to the shaft. The ears 42 are connected to a rod end 43 on a control link 44. The rod end 43 again is a spherical seat type bearing for limited universal pivoting movement. The control link 44 has its opposite end connected through a rod end 45 to a bracket 46 that in turn is fixed to a frame arm member 50 which is fixed to and cantilevered from the upper rail 14B of the center frame member. The opposite end of shaft 36 is provided with a pair of parallel faces 52 (flat spots) one of which is facing the viewer in FIG. 4, and a bifurcated lever assembly 47 comprising a pair of parallel straps which straddle the flat spot, is pivotally mounted to the shaft 36 at a pivot 53. The lever 47 is also pivotally mounted as at 48 to a bracket 49 supported back from the support base frame or back member 13. A spherical seat rod end bearing is used for mounting the lever 47 at pivot 48 to permit limited pivoting of lever 47.

The position of the lever 47 about pivot 48 is controlled through the use of the hydraulic cylinder assembly 54, which is a double acting servovalve controlled hydraulic cylinder. The rod end of cylinder 54 is connected with a spherical rod end bearing 55 to lever 47. The base end of the cylinder 54 is connected to a support ear 56 on back frame member 13 with a spherical rod end bearing 57.

The position of the rod of cylinder assembly 54 determines the position of the lever 47, and the position of the lever 47 in turn determines the orientation of the shaft 36 in the plane defined by the axis of the shaft 36 and perpendicular to the actual pivot axis of lever 47. The center line of link 44 also lies along this plane. The lever 47 thus controls the orientation of the axis of rotation of the belt mounting drum 30. Note that in any movement of the lever 47, the pin 53 will move in a slightly arcuate path causing that end of shaft 36 to move. The path of movement of the shaft 36 is constrained by the links 37 through use of spherical bearings 38, and also by the link 44. Link 44 causes the opposite end of the shaft 36 to move in a slightly arcuate path, as determined by the length of the link 44 in relation to its mounting rod end 45 which is mounted on a pin 45A.

Thus, there is a limited amount of tilting movement that is possible for the drum 30, and this tilting is an adjustment made to compensate for side loads on the belt to keep the belt centered. It should be noted that the annular wall 34 of the drum 30 is not crowned, but rather is a cylindrical surface, with the webs 33 and hub 32 supported on the interior in a normal manner.

Figure 7:
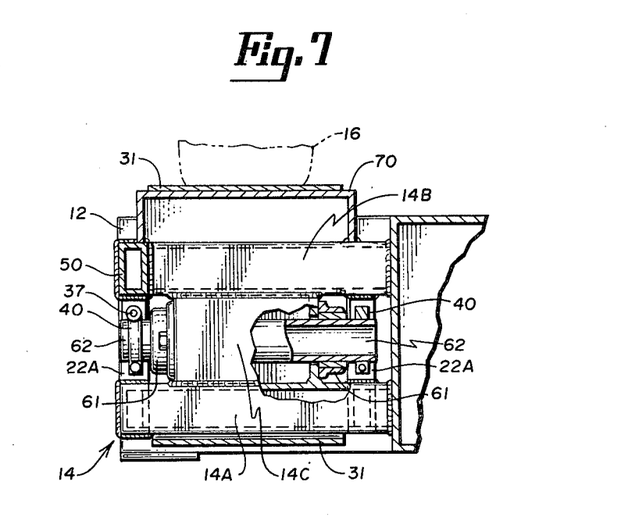
FIG. 7 is a sectional view taken along line 7—7 in FIG. 6.

As stated, the opposite ends of the mounting links 37 are both attached to torsion tube levers 40, which are part of a torsion tube assembly indicated generally at 60 (FIG. 7). The torsion tube 62 is mounted in suitable support bearings or sleeves 61,61 which in turn are mounted to central web 14C of the center frame section of the support base frame. There is a lever 40 fixed at each of the opposite ends of the tube 62, and it can thus be seen that any differential movement of the shaft 36 tending to skew the shaft 36 in a horizontal plane will require twisting of the tube 62. Thus a very stiff reactive element is provided by the torsion tube tending to hold the axis of the shaft 36 from skewing so that the axis of shaft 36 remains parallel to the axis of the shaft 23 for drum 20. Rotation of the shaft 36 in the plane of control of lever 47, however, is constrained by the links 44 and 37 and can be controlled through the operation of cylinder 54.

The "take-up" of the belt 31 is accomplished through the use of the torsion tube assembly 60 as well. In the form of the invention shown, a pair of hydraulic cylinders, one of which is indicated at 65 in FIGS. 1 and 2, are used for adjustment. The cylinders are mounted on opposite sides of the belt assembly in identical manner and thus the mounting of only one cylinder will be explained. One end of each cylinder 65 is pinned as at 66 to a bracket that is attached to the respective frame members 22A and 22B. The rod end of the respective cylinder assembly 65 is pinned with a pin 67 to the lever 40, as shown in FIG. 2, for example, at position spaced from the connection of the links 37. By extending both of the cylinders 65 simultaneously, the levers 40 will be rotated, along with the tube 62 supported in the bearings 61 and this will then place compression into the links 37 and increase the tension in the belt 31.

The control lever 47 for drum 30 can cock slightly about its mounting 48 to provide for movement of the roller or drum 30 for belt take-up. Likewise, it should also be noted that the link 44 connections at its opposite ends made about axes that are 90° to each other, so that the link 44 is in effect universally mounted between the support member or ears 46 that are attached to the frame members 47. The cylinders 65 are servovalve controlled and may thus be used to regulate the tension in the belt using suitable feedback signals.

Hydraulic cylinders 65 can be replaced with heavy duty springs if desired, and the same rigidity of mounting of the take-up drum 30 in respect to skew of the axis, which causes unequal tension in the opposite edges of the belt 31 is still achieved because of the torsion tube 62. The skew of the axis of one drum relative to the other is the shifting out of parallel so that the edges of the belt are subjected to differential tension.

The movement of the drum 30 under control of lever 47 places a twist in the belt, but does not cause the belt to shift axially on the drums. The torsion tube resists the skewing of the take-up drum which tends to cause the belt to shift when it is driven. The links 37 can be manually adjusted for initial length adjustment to make sure that the shaft 36 and 23 are precisely parallel to each other initially.

The frame member 14B also supports a center block 70 that has an upper surface lying along the plane defined by the plane lying tangent to the upper edges of the two drums 20 and 30, and the upper surface of the block 70 provides a reactive surface for loads on the belt 31 between the drums 20 and 30. The upper surface of the block 70 may have a low friction coating, such as plastic, or if desired there could be means to provide a fluid film for supporting the belt under the tire load to reduce the friction load on the belt.

It should be noted that the length between the axes of shafts 23 and 36 is reduced to a minimum in relation to the width of the belt so that there is a very low length to width ratio, and thus very stiff construction which holds the belt properly during operation.

In any tire testing apparatus, in addition to having the road simulator belt mounted rigidly and properly as in the construction just described, it is important to be capable of applying known, controlled, and properly oriented loads onto a tire that is being tested. The present device supports the tire relative to the support base through the frame assembly 17 and the vertically movable column 18. The A frame assembly 17 includes a first leg 75, and a second leg 76 which are spaced apart at their lower ends. Mounting brackets 75A and 76A, respectively are mounted at the lower ends of legs 75 and 76. These mounting brackets comprise spaced apart ears which receive a center mounting ear 77 and 78, respectively, which in turn are fixed to the legs 11 and 12 of the support base frame. The brackets 77 and 78 are on the upper surface of these legs and the ears extend upwardly. The pivot pins indicated at 77A and 78A, respectively, are coaxial and the pivot axis lies along a plane defined by the upper surface of the belt 31 in the "tire patch" or contact area with the tire 16 and on the tire centerline.

The legs 75 and 76 are joined together in a central area 86 overlying the center portion of the road simulator belt assembly 15. The legs define an open area indicated at 81 which provides space for mounting the tire 16.

Figures 3, 5:
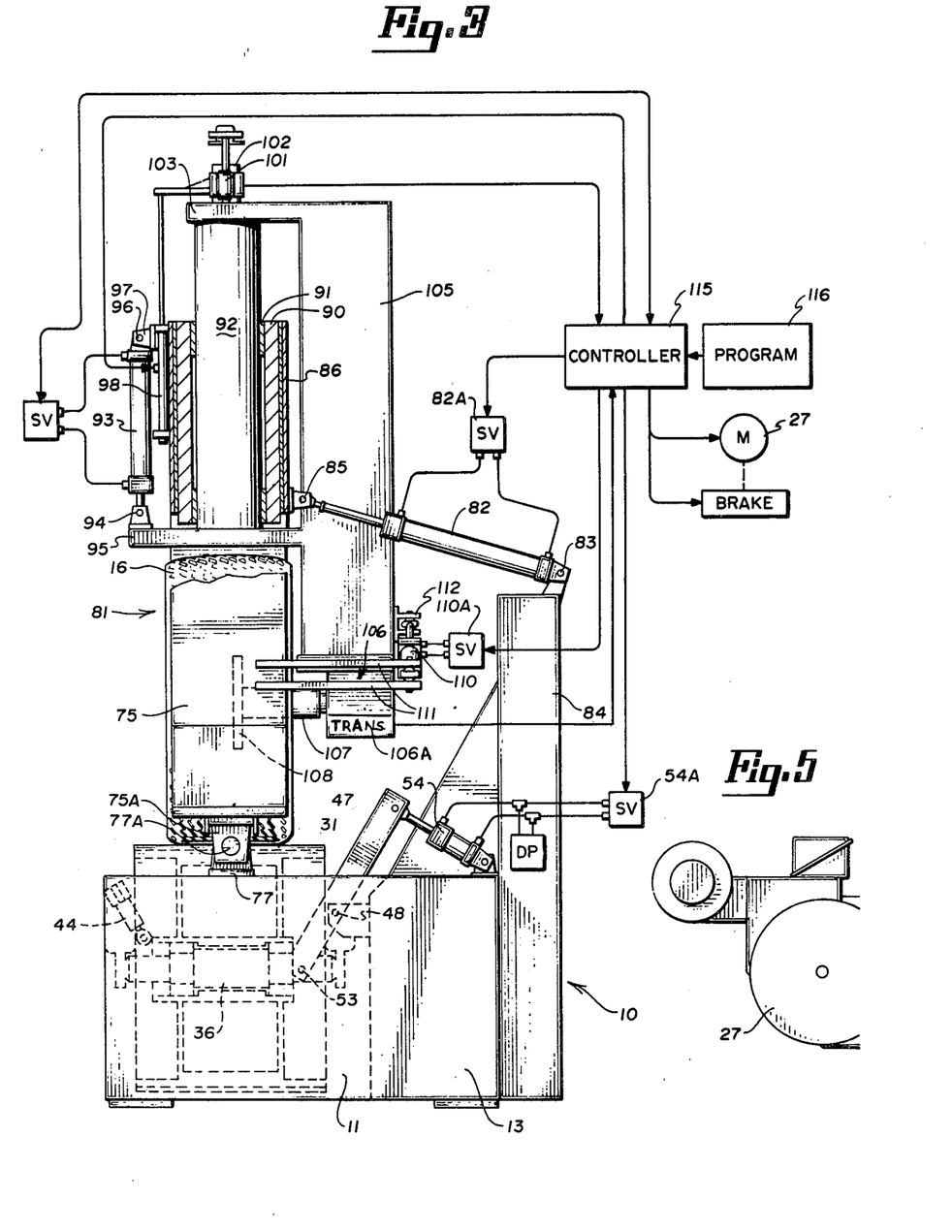
FIG. 3 is an end view of the device of FIG. 2 as viewed from the right hand end thereof.
FIG. 5 is a fragmentary side view of the rear portion of the device of FIG. 2 showing a portion of the drive motor used for driving the road simulator drive belt.

The position of the A frame assembly about the axis of pins 77A and 78A is controlled through the use of a hydraulic cylinder assembly indicated at 82 (see FIG. 3). The cylinder assembly 82 is a double acting cylinder which is controlled with a servovalve 82A. The base end of the cylinder 82 is connected as at 83 to a bracket mounted on an upright column 84 attached to the back member 13 of the support base frame and extending upwardly therefrom. Note that column 84 is rigidly connected and braced back down to the back member 13 of the support base frame. The rod of the cylinder assembly 82 is connected as at 85 to a bracket that is attached to the center portion 86 of the A frame 17, which center portion joins the legs 75 and 76 together.

The cylinder 82 is controlled with servovalve 82A to maintain the orientation of the A frame assembly 17 about the pivot axis of pin 77 so that the desired amount of camber is provided for the tire assembly 16 that is being tested.

The center portions 86 of the A frame assembly mount a sleeve 90 that is fixedly attached to the A frame assembly between the exterior walls. Note the A frame is also tubular. The sleeve assembly 90 in turn has suitable sleeve type bearings 91 that are used for slidably and rotatably mounting a steering tube 92. The steering tube 92, as shown, is longer than the tube or sleeve 90 and thus can be moved in a vertical direction relative to the sleeve 90 and the A frame assembly through the use of a vertical hydraulic cylinder 93 that has its rod end connected as at 94 to a bracket 95 that passes through the underside of the connecting or central portion 86 of the A frame. The base end of the cylinder assembly 93 is connected as at 96 to a bracket 97 which is fixedly attached to the exterior of central portion 86 of the A frame. The cylinder assembly 93 is also suitable controlled by a servovalve control 93A.

In addition a suitable position or stroke transducer indicated generally at 98 can be utilized for determining the position of the tube 92 relative to the central portion 86 of the A frame 17 and relative to belt 31.

The stroke or position transducer 98 is an LVDT sensor, and one end is connected to a supporting framework 101 that in turn is attached to the A frame 17, and it should be noted that the framework 101 mounts an angle transducer 102 that has an output which is connected to an upper bracket 103 also fixed to the tube 92, and upon rotation of the tube 92, the angular position will be sensed by the sensor 102 relative to a reference position.

As can be seen in FIG. 3, the brackets 103 and 95 are both fixedly attached to upright support beam 105, which can be of square cross section and made as rigid as desired. The brackets 95 and 103 are also fixed to the ends of tube 92 after the tube 92 has been placed through bearing 91, so that the beam 105 and tube 92 move together. The tube 92 and beam 105 can be vertically adjusted as explained and also can be rotated about the axis of the tube. The cylinder 93 is mounted through spherical seat rod end bearings to permit a limited amount of swing of the lower bracket 95 as the tube pivots about its upright axis.

The lower end of the upright beam 105 extends below the center portion 86 of the A frame and a housing or hub 106 mounted adjacent the lower end. The hub 106 rotatably mounts a support spindle 107 that has a wheel flange 108 adapted to accommodate the bolt circle of a wheel 109 which is the wheel mounting the tire 16 which is to be tested. The vertical position of the tube 92 and beam 105 is determined by the tire size, and of course the cylinder 93 can be used for loading the tire down against the upper surface of the roadway simulation belt 31 with the desired force. The hub 106 includes a suitable sensor or transducer 106A to directly sense and determine the tire rolling resistance, and the loads and moments on the spindle 107 exerted by the tire control cylinders. If desired, differential pressure sensors may be used at each control cylinder to determine loads exerted.

The axis of the spindle 107 intersects the axis of the tube 92, and it can be seen that the central axis of tube 92 coincides with the center of the tire 16 that is being tested. The axis of tube 92 simulates the steering axis of an automobile on which the tire would be mounted, and the position of the tube 92 about its axis is controlled through the use of a hydraulic cylinder 110. The cylinder 110 has its base end connected to brackets 111 that are mounted on the leg 75 of the A frame. Brackets 111 as shown extend laterally outwardly from the A frame to align the cylinder at the side of the beam 105 opposite from the tire.

The rod end of the cylinder 110 is connected to brackets 112 that are fixed to the beam 105. The cylinder 110 is also a double acting cylinder controlled through a suitable servovalve 110A. Extension or retraction of the cylinder rod of cylinder 110 will cause the beam 105 to be rotated or steered about the axis of the tube 92, and also therefore the tire 16 supported on the spindle 107 and hub 108 will be steered.

Note in particular that the steering load, that is the load on the cylinder 110, is reacted directly to the A frame, and is not separately reacted into a support beam independent of the A frame. Further, the cylinder 110 is connected to its respective support brackets 111 and 112 through rod end spherical seat bearings so that vertical movement of the beam 105 will be accommodated.

OPERATION

The desired load functions are controlled to the various cylinders through the use of servovalves as previously explained, operating from a central controller indicated at 115, which carries out a program represented at 116. These controls are substantially state of the art as shown in the articles and prior art patents cited in the introductory portions of this specification. The controls are programmed to provide desired amounts of camber, steering, and vertical load on the tire being tested. The speed and braking of the motor 27 also may be controlled.

The axis of support of the tire supporting A frame is directly along the center line of the tire or the center line of the tire patch where it contacts the testing belt, and thus there is no cantilevered loads reacted back to a main support frame. This insures that position control can be more precisely accomplished, and the camber angle, that is the angle from vertical about the axis of the pin 77A and 78A is again reacted directly through the center line of the tire patch.

The camber angle is controlled by the cylinder 82, which controls the pivot angle of the A frame assembly. The vertical load is controlled by the cylinder 93 through controls 115 and servovalve 93A, and the steering is controlled by the cylinder 110 and its associated servovalve 110A through the central controller 115.

Further, by programming the control properly, the side loads on the belt 31 caused by camber, or, primarily, by steering, can be compensated by the operation of cylinder 54 to tilt the axis of the take-up drum 30 as constrained by link 44 and links 37, as well as by lever 47 to prevent the belt from shifting laterally on the drums. Various controls and programs for such controls are well known in the field, and the mechanical geometry of the unit makes the device more easily fabricated, and operate satisfactorily without requiring great amounts of external compensation.

The central axis of the link 44, and the plane of lever 47, which is defined by the axes of connections 53, 55, and pivot 48, intersect in the center of the drum 30 where the vertical center plane of the tire joins the outer periphery of the drum or roller 30. This intersection occurs along the plane of the lower length of the belt (the length opposite from the tire engaging length) when the drum 30 axis is parallel to the axis of the drum 20. The tilting of drum 30 is about an axis perpendicular to the axis of drum 20 and lying in the plane of the lower length of the belt. The geometry of the drum mounting permits the camber of the drum 30 to be altered to compensate for side loads on the belt caused primarily by steering of the tire and also from camber and tire asymmetry without excessive tension or twisting of the belt.

It should also be noted that the "skew" of the axis of roller or drum 30 may also be termed "yaw", which is the amount of deviation of the axis of drum 30 from parallel in a plane defined by the axes of the two drums.

The tire 16 also may be driven with a separate motor by driving the spindle that mounts the tire if desired. Further, the tire can be connected to a brake drum. The brake can be a conventional disc brake or drum-type brake attached to the spindle in the usual manner. The brake would then retard the tire and exert braking loads if desired.

The camber loading of the tire is only through the A frame 17 which gives the very high camber stiffness. There are no cantilevered loads that need to be compensated, and all of the major frame loads pass through the tire contact centerline, including the camber, steering, and the vertical load. The reactions from loading are thus easily controlled.

It also has been found that using the parameter of belt edge position, belt side load and cylinder 54 position, the belt lateral position can be controlled precisely.

Figure 8:
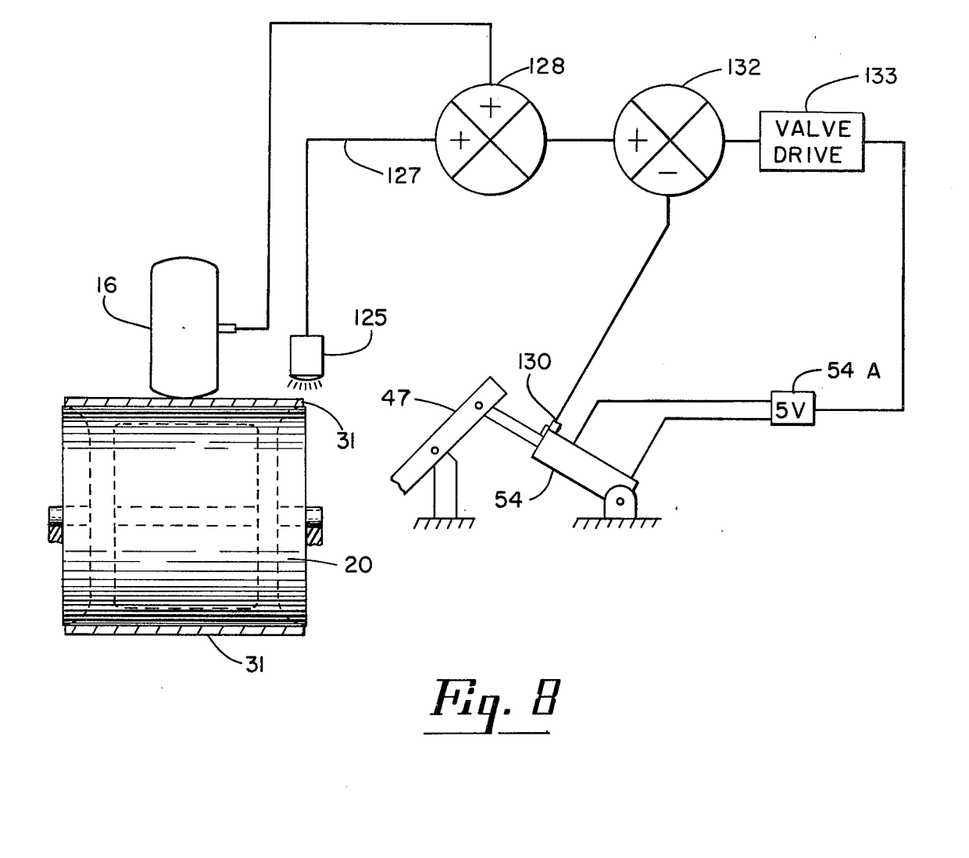
FIG. 8 is a schematic view of a belt position sensor used in controlling the belt tracking control drum.

In FIG. 8, a specific sensor for sensing the position of the belt is shown schematically, and this belt edge position sensor is used for controlling the cylinder 54 and the servovalve 54A shown in FIG. 5, to thereby control the lever 47 and the mechanism which keeps the belt on track. The sensor shown is a sensor 125 comprising an infrared source and reflected infrared receiver mounted adjacent the drive drum 20 and adjacent one edge of the belt. The infrared sensitive receiver senses rays reflected from the belt and provides an electrical signal along a line 127 that is proportional to the reflected infrared rays received by the receiver in sensor 125. The sensor is located partially overlying the edge of the belt in the belt "normal" or centered position. Any shift of the belt changes the value of the electrical signal on line 127.

Such sensors are well known in the control art and if desired, eddy current proximity sensors can be used.

The signal on line 127 is summed at a summing junction 128, if desired with a signal representing lateral force on the tire 16. The lateral force on the tire is a function of the steering and camber loads as described in the description of FIGS. 1–7 and used for control of belt position as described in relation to FIGS. 1–7.

The summed signal from summer 128 comprises a drum camber or tilt command signal to control the camber or tilt of drum 30. The cylinder 54 is the drum position control cylinder, and with a belt position signal being used for control, a feedback signal indicating the position of the cylinder rod, and therefore the tilt or camber position of drum 30, as guided by lever 47, link 44 and the support link 37 is used. The feedback sensor 130 comprises an LVDT providing a feedback signal on line 131 to a second summer 132 which in effect provides the servovalve control signal for servovalve 54A. A valve driver or valve amplifier 133 is used to drive the servovalve and thus to change the camber or tilt of the drum 30 to compensate for shifts in the belt position.

The lateral force on the belt is a function of steering and camber loads as previously explained. Signals indicating such lateral force can be sensed by differential pressure on the cylinders controlling the tire movement or by a separate force sensor on the tire spindle, if desired. The signal representing lateral force on the tire improves the response of the belt position, but with a belt position sensor used, there is active control of the belt with zero lateral loads.

The position of the cylinder 54 is controlled to tilt the drum 30 through the use of the lever 47 and link 44 to compensate for any change in position of the belt. The direction of movement of the cylinder 54 is such that the drum 30 tilts to cause the belt to move back to its centered position on the drums 20 and 30. The LVDT 130 provides the feedback signal to the controls for servovalve 54A in a normal manner so that the signals from the sensor 125 will be subject to closed loop control. The feedback signal will cause the cylinder 54 to establish the belt at the proper position on the drums 20 and 30.

The position sensor 125 signal along line 127 can be used alone, or in combination with the signals indicating side loads on the belt which were described in connection with FIGS. 1 through 7 for controlling the cylinder 54 in the control and feedback mechanism as previously described.

The belt position sensor provides a direct position signal that can be correlated to keep the belt at a desired lateral location on the drums.

The sensor 125 provides a signal which is along line 127 which is proportional to the amount of infrared radiation reflected back to a infrared sensitive receiver in the sensor. As the belt 31 shifts sideways to either side, the reflected infrared rays (reflected from the belt) changes in intensity because the sensor 125 only partially overlaps the belt edge when the belt is in centered position. The signal along the line 127 changes in value to indicate the amount and direction of belt shift and the cylinder 54 is actuated to restore the belt to its desired position. Of course many different types of sensors can be used to provide a signal indicating lateral movement of the belt from the desired position.

What is claimed is:

1. A machine having a pair of drums for mounting a road simulation belt thereon for movement as said drums are driven, comprising a frame member for supporting said drums with the surfaces of the drums closely spaced from each other;

means to rotatably mount a first of said drums on said frame member, means to rotatably mount a second of said drums relative to said frame member about an axis generally parallel to the axis of the first drum;

said drums being positioned with the sides thereof generally aligned, and there being first and second planes tangent to the drums extending between said drums, and along which planes any belt mounted on said drum moves;

said frame member including first and second portions on opposite sides of said second drum;

said means to rotatably mount said second drum including;

a link universally pivotally connected to said first portion of the frame and connected to support said second drum adjacent one side thereof, a lever arm pivotally mounted to the second frame portion about a lever axis generally perpendicular to the axis of rotation of said second drum, means coupling said lever arm to the second drum on the opposite side of the drum from the link to permit the second drum to rotate relative to said lever arm, and support link means mounted relative to the frame to guide movement of said second drum to cause said second drum to tilt about a tilt axis lying along one of said planes and generally perpendicular to the axis of rotation of said second drum when said lever arm is moved about its lever axis.

2. The machine of claim 1 and power means to control movement of the lever arm about its lever axis.

3. The machine of claim 1 wherein said support link means mounted to guide movement of said second drum comprises a pair of second links on opposite sides of said drum having first ends supported on a frame portion and second ends rotatably mounting said second drum, said lever arm being universally pivotally mounted to said frame at its first end and to said drum at the second end, said first mentioned link and said lever arm being designed to constrain the movement of said drum in cooperation with said second links.

4. A belt control apparatus comprising:

a first drum mounted for rotation about a first axis;

a second drum mounted for rotation about an axis parallel to said first axis;

an endless belt mounted about said drums providing first and second parallel generally planar belt lengths extending between said drums;

means applying a load to the upper length of the belt which from time to time creates side loads on the belt;

means for mounting the second drum to permit pivotal movement of said second drum about a second axis which is substantially perpendicular to said first axis and contained in a plane substantially in the plane of the lower length of the belt; and means to control movement of the second drum about the second axis to tilt the axis of rotation of the second drum to tend to keep the belt from shifting laterally on the drums from a reference position or from general misalignment of the belt.

5. The belt control apparatus of claim 4 wherein the means to control movement comprises a double acting hydraulic cylinder.

6. The belt control apparatus of claim 4 wherein the means for mounting the second drum comprises a link on one side of the drum having one end pivotally mounted on a support, and the second end pivotally mounted to the drum, a lever on the other side of said drum pivotally mounted about one pivot axis to a support and about a second pivot axis to the drum, the line passing through the pivot axes of the link and the line passing through the pivot axes of the lever intersecting at the second axis.

7. The apparatus of claim 6 and bearing means on opposite sides of the second drum rotatably mounting the second drum about the axis parallel to the first axis, said link and said lever each being pivotally mounted to a portion of the bearing means.

8. The apparatus of claim 6 wherein said lever extends beyond the one pivot axis in direction opposite from the second drum, and a double acting hydraulic cylinder connected to said lever for controlling the position of said lever about said one pivot axis and thereby controlling the position of said second drum about the second axis.

9. The apparatus of claim 4 wherein said drums have uncrowned cylindrical outer surfaces.

10. The apparatus of claim 4, 5 or 6 including means to sense the position of said belt in relation to the reference position on said drums and to provide a signal to said means to control movement to tend to restore said belt to its reference position in direction along the axis of rotation of said drums when the belt shifts from said reference position.

* * * * *